United States Patent [19]
Lucak et al.

[11] Patent Number: 4,785,255
[45] Date of Patent: Nov. 15, 1988

[54] DIGITAL FSK SIGNAL DEMODULATOR

[75] Inventors: Mark Lucak, Saline; Michael Klein, Ann Arbor, both of Mich.

[73] Assignee: Allen-Bradley Company, Inc., Milwaukee, Wis.

[21] Appl. No.: 124,154

[22] Filed: Nov. 23, 1987

[51] Int. Cl.[4] .............................................. H03D 3/04
[52] U.S. Cl. .................................. 329/126; 329/110; 375/45; 375/88
[58] Field of Search .................. 329/110, 126; 375/45, 375/88, 94; 455/205, 214, 334, 337

[56] References Cited

U.S. PATENT DOCUMENTS

| | | | |
|---|---|---|---|
| 3,437,932 | 4/1969 | Malakoff | 325/320 |
| 3,522,539 | 8/1970 | Levine et al. | 325/320 |
| 3,614,639 | 10/1971 | Belman | 329/126 X |
| 4,115,738 | 9/1978 | Mitarai et al. | 329/105 |
| 4,287,596 | 9/1981 | Chari | 375/49 |
| 4,457,005 | 6/1984 | Burke et al. | 375/82 |
| 4,529,941 | 7/1985 | Lipoff | 329/112 |
| 4,561,098 | 12/1985 | van Tol | 375/49 |
| 4,569,060 | 2/1986 | Esterling et al. | 375/51 |
| 4,569,061 | 2/1986 | Breitwisch | 375/90 |
| 4,611,335 | 9/1986 | Arai et al. | 375/110 |

Primary Examiner—Eugene R. LaRoche
Assistant Examiner—Robert J. Pascal
Attorney, Agent, or Firm—Quarles & Brady

[57] ABSTRACT

A demodulator for a phase coherent frequency shift keyed signal has a master clock which generates a signal having a plurality of pulses during each half of the bit internal of the FSK signal. A detector determines during which master clock pulse within several groups of X number of pulses the most transitions occur in the received signal. Based on the determined clock pulse, samples taken in each of two consecutive half-bit intervals of the FSK signal are selected for comparison to produce the demodulator output signal.

14 Claims, 5 Drawing Sheets

DIGITAL FSK SIGNAL DEMODULATOR

BACKGROUND OF THE INVENTION

This invention relates to receivers for frequency shift keyed signals and more particularly to digital devices for asynchronous demodulation of such signals.

Frequency shift keyed (FSK) modulation is employed to serially transmit digital data over a telephone line or similar media. The FSK signal is produced by shifting a carrier signal between two distinct frequencies, commonly referred to as mark and space tones. The value of each digital data bit determines the frequency of the carrier to be transmitted. Zero bits generate the space tone and one bits produce the mark tone. Each bit is sent by shifting the carrier to the corresponding frequency for a fixed period of time referred to as the bit interval.

The reception of FSK signals must include a mechanism for demodulating, or decoding, the signal to recover the binary data. The reception involves the detection of unknown signals having an unknown phase. Prior art systems for the demodulation of FSK signals have generally employed analog filtering approaches or alternatively, phase or frequency locked decoding techniques. In the first approach, the signal to be demodulated is applied to a pair of analog filters, each of which has a pass band centered at the mark and space tones of the FSK signal being received. The filters must have a well-defined yet relatively narrow pass band and detection is based upon sensing the output of each filter. The filter having the greatest output indicates the reception of the corresponding character. Often the design of such analog filters is extremely laborious and must include complex signal conditioning. The resulting demoduator apparatus is expensive to fabricate and does not readily lend itself to fabrication on a single integrated circuit using conventional techniques. Furthermore such apparatus is subject to frequency drift and precise demodulation of the incoming information can not be reliably achieved over extended periods of time or through variations in temperature without periodic readjustment. Such adjustment is not practical when the circuitry is incorporated in an integrated circuit.

Similarly, when phase or frequency locked loops are employed for the purpose of demodulating FSK information, highly precise closed loop feedback techniques must be used and the band width of the phase locked loop must be generally wider than the optimum detection band width. Additionally, the resulting analog circuit is generally difficult to design and costly to implement. These circuits too are not well suited for implementation through the use of conventional integrated circuit fabrication techniques.

SUMMARY OF THE INVENTION

In accordance with the teachings of the present invention, a demodulator for a phase coherent frequency shift keyed (FSK) signal includes a master clock for generating a signal having X number of pulses during each half of the bit interval of the FSK signal. A mechanism is provided for sampling the received signal upon the occurrence of each clock pulse.

The demodulator also includes a circuit for detecting if a transition has occurred in the FSK signal at each clock pulse. The clock signal is divided into groups of X ordinally numbered pulses. A counter means is provided to tabulate the number of transitions that occur in the FSK signal for each of the X ordinally numbered pulses in several groups of pulses. The circuit determines the ordinally numbered pulse at which the most transitions occur. This pulse coincides with the beginning of each half bit interval and provides a timing reference for the demodulator. In response to this determination, the demodulator selects a pair of samples taken during different halves of the bit interval. A comparison of the samples indicates the received binary data character.

An object of the present invention is to provide a phase-coherent FSK demodulator that employs digital techniques suitable for fabrication on an integrated circuit so as to provide a highly accurate and reliable device for decoding the FSK signal.

DETAILED DESCRIPTION OF THE INVENTION

Figure 1:
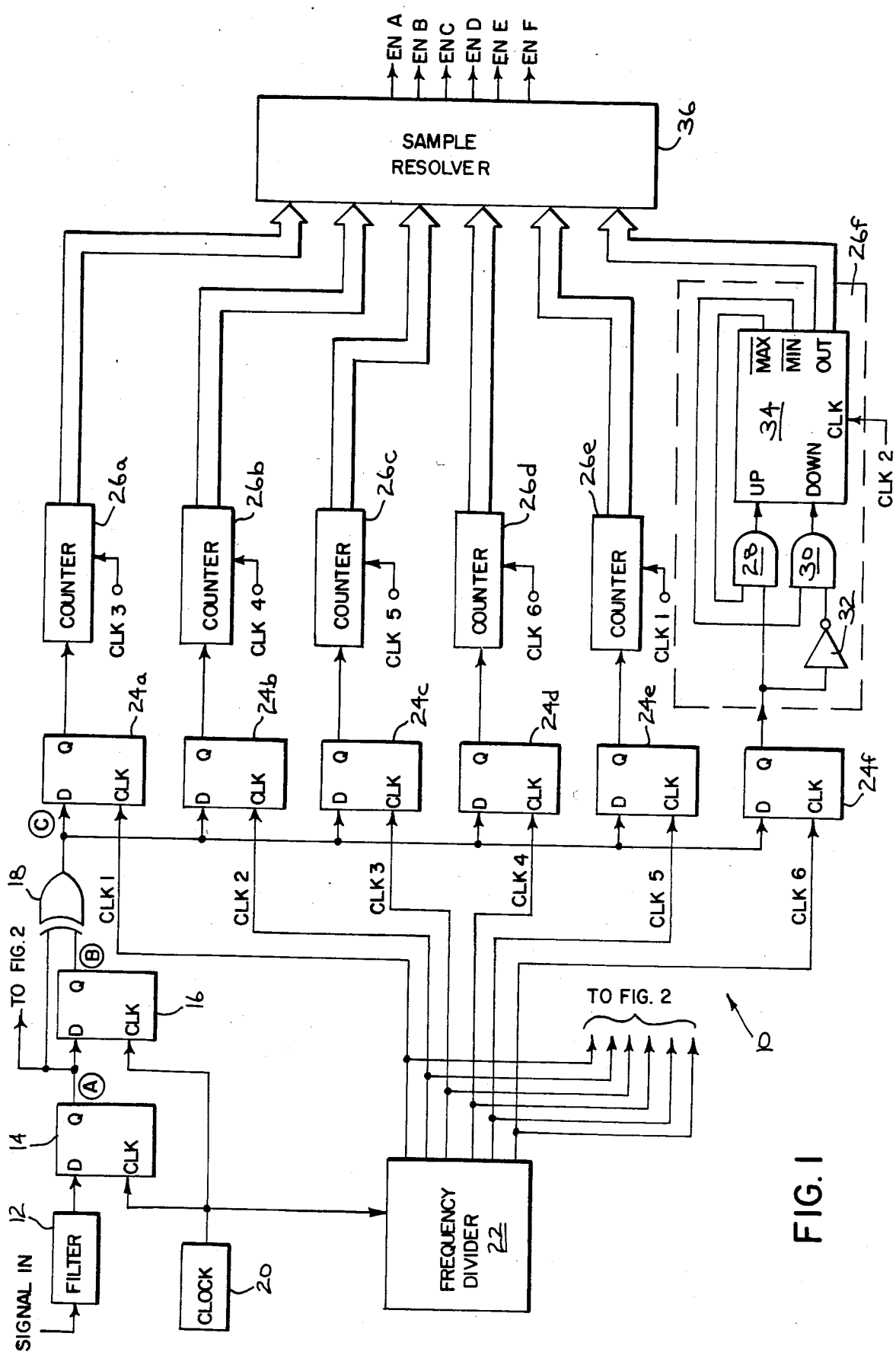
FIG. 1 is a block schematic diagram illustrating a portion of a demodulator according to the present invention.
Figure 2:
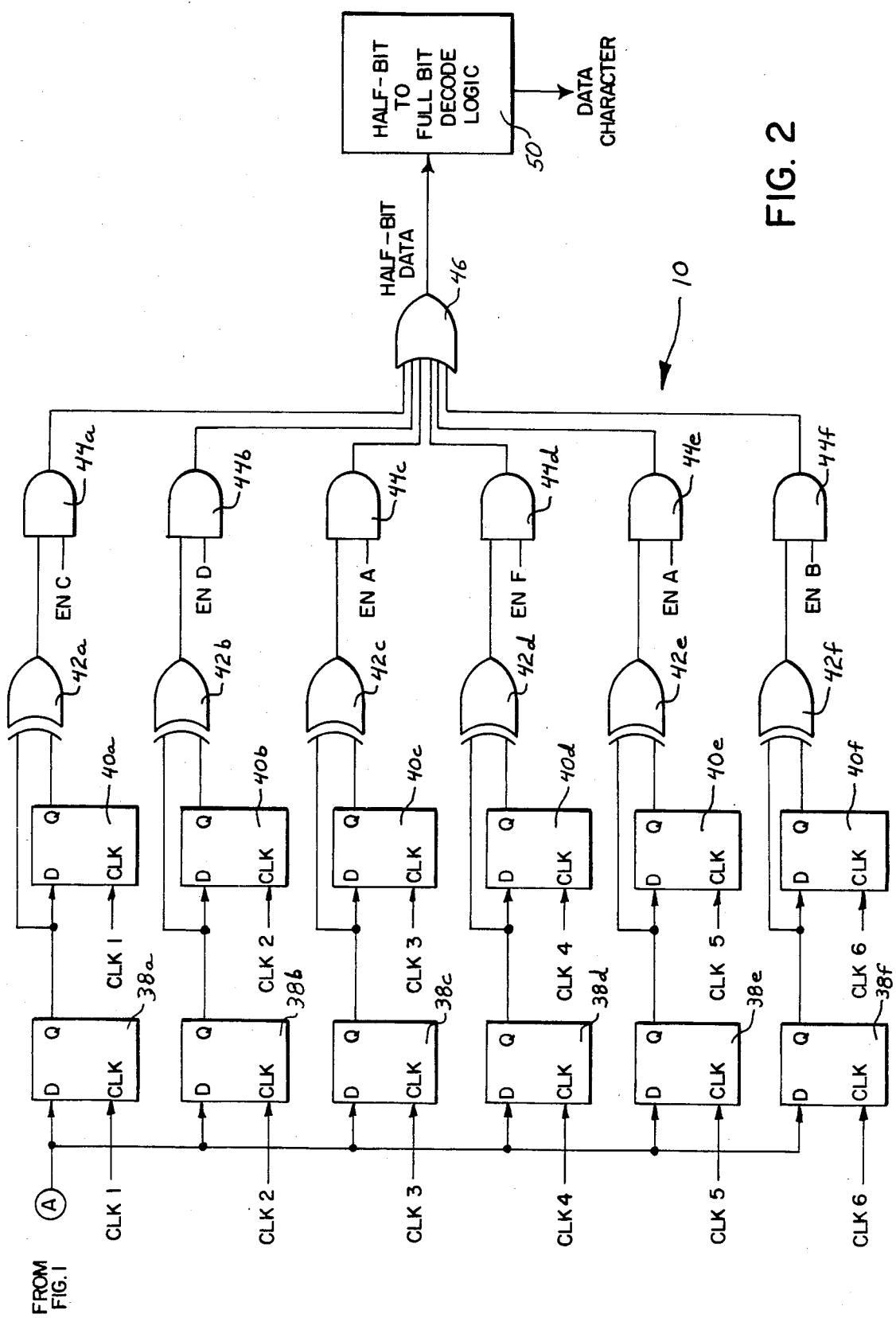
FIG. 2 is a schematic block diagram illustrating the remaining portion of the demodulator circuit.

The components of the present FSK signal demodulator are shown in FIGS. 1 and 2. As an overview of the demodulator's operation, the signal is digitally sampled six times during each half of the bit interval. The portion of the demodulator in FIG. 1 compares pairs of consecutive samples to detect a signal transition between the samples. The number of transitions between each pair of samples in several half bit intervals is tabulated to determine which sampling period coincides with the beginning of each half of the bit interval. This provides a timing reference for choosing the actual samples to use to decode the FSK signal.

The portion of the demodulator in FIG. 2 stores the two sets of six samples taken during the bit interval. The timing reference from the FIG. 1 circuit is used to select two stored samples, one from each set, which are exclusive OR'ed to produce the demodulator output representing the received character bit.

DESCRIPTION OF THE CIRCUIT

With initial reference to FIG. 1, a demodulator generally designated as 10 has the received FSK signal applied to a filter 12 which passes a band of frequencies containing the mark and space character frequencies. The mark and space frequencies are used to transmit binary ones and zeroes respectively. The filter 12 also converts the sinusoidal input into a square wave signal at its output. The output of the filter 12 is connected to the D input terminal of a sampling flip-flop 14. The Q output of the sampling flip-flop 14 is connected to the D input of a second flip-flop 16 and to one input of an exclusive OR (XOR) gate 18. The other input of XOR gate 18 is connected to the Q output of the second flip-flop 16.

A master clock 20 is connected to the clock inputs of the sampling and the second flip-flops 14 and 16. The clock 20 produces a signal having a frequency that is several times the frequencies of the mark and space characters. Specifically in this embodiment, the clock 20 emits six pulses during each half of the bit interval of the FSK signal, causing the sampling flip-flop 14 to take six signal samples during each half bit interval.

Figure 7:
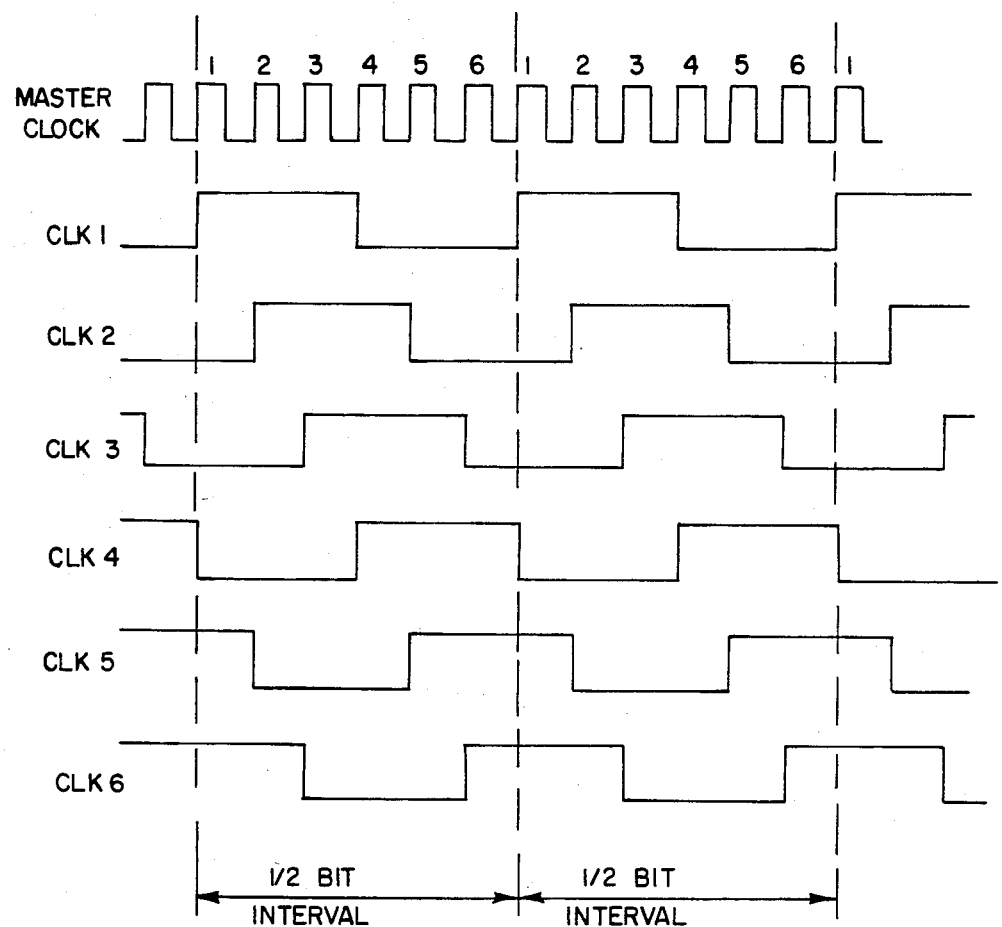
FIG. 7 shows the waveforms of the various clock signals produced by the frequency divider in FIG. 3.

The output of clock 20 is also coupled to the input of a frequency divider 22. The frequency divider 22 derives six secondary clock signals from the master clock signal, each having one-sixth the frequency of the master clock signal. As shown in FIG. 7, the frequency divider 22 produces six separately phased secondary clock signals CLK1-CLK6 from each group of six consecutive master clock pulses. Each of the secondary clock signals has a pulse that begins within each half bit interval upon the occurrence of a different one of the master clock pulses.

Figure 3:
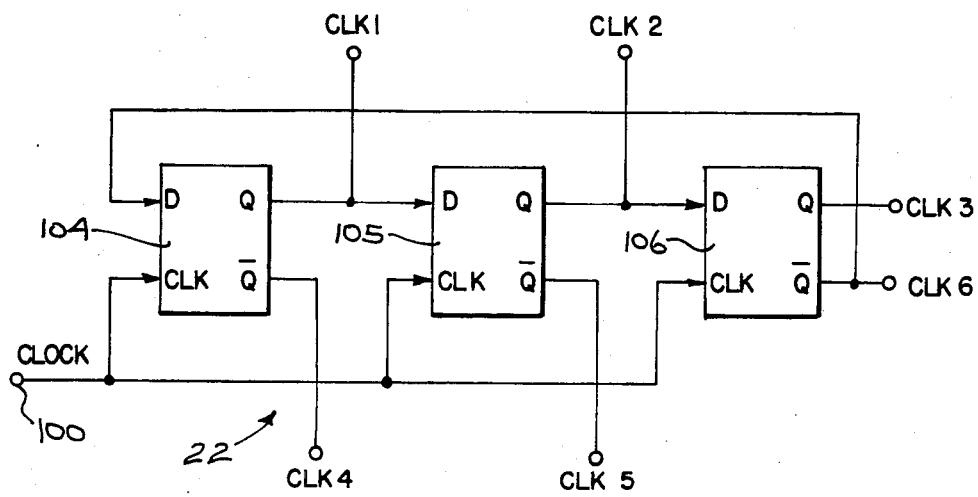
FIg. 3 is a schematic block diagram of the frequency divider shown in FIG. 1.

The circuit for the frequency divider 22 is shown in detail in FIG. 3. The frequency divider has the master clock signal applied to terminal 100 which is coupled to the clock input of three divider flip-flops 104-106. The Q output of the first divider flip-flop 104 produces the CLK1 signal and is coupled to the D input of the second divider flip-flop 105. The not Q output of flip-flop 104 produces the CLK4 signal. The Q output of the second divider flip-flop 105 generates the CLK2 clock signal which is coupled to the D input of the third divider flip-flop 106. The not Q output of the second divider flip-flop 105 produces the CLK5 signal. The Q output of the third divider flip-flop 106 produces the CLK3 clock signal. The not Q output of the third divider flip-flop 106 produces the CLK6 clock signal which is coupled back to the D input of the first divider flip-flop 104.

Returning to FIG. 1, the six secondary clock frequencies CLK1-CLK6 from the frequency divider 22 are coupled to the clock inputs of six counter stage flip-flops 24a-f. The D input to each of the counter stage flip-flops 24a-f is connected in common to the output of the exclusive OR gate 18. Each of the Q outputs Qa-Qf of the counter stage flip-flops 24a-f is connected to a separate bit counter circuit 26a-f. The detail of the counter circuits is shown for the sixth bit counter circuit 26f and is the same for each of the other counter circuits 26a-e. The Q output from the sixth counter stage flip-flop 24f is connected to one input of an up AND gate 28 whose output is coupled to the up count enable terminal of a bidirectional binary counter 34. The Q output of the sixth counter stage flip-flop 24f is also coupled through an inverter 32 to the input of a down AND gate 30 whose output is connected to the down count enable terminal of bidirectional counter 34. The other input of the up AND gate 28 is coupled to the not maximum count output terminal of the counter 34 and the other input of the down AND gate 30 is connected to the not minimum count output of the counter. Each of the counters 34 also receives a different one of the secondary clock signals CLK1-CLK6 applied to its clocking input terminal. For example, counter 26f has the CLK2 signal applied to its bidirectional counter 34.

The multi-bit output word for each of the counter circuits 26a-f is coupled to a sample resolver 36. The sample resolver 36 periodically examines the count from each of the counter circuits 26a-f and produces an enabling signal on one of six output lines ENA-ENF, indicating which of the counter circuits 26a-f respectively has the highest count. The sample resolver 36 compares the bits in the output words from the counter circuits 26a-f to select the counter having the largest value. Each enable output ENA-ENF from the sample resolver 36 is coupled to the remaining portion of the demodulator circuit shown in FIG. 2.

The output of the sample flip-flop 14 at node A is also connected to the D input of a first set of six flip-flops 38a-f in FIG. 2. These six flip-flops 38a-f are clocked by different ones of the secondary clock signals CLK1-CLK6 to store six consecutive samples of the FSK signal. The Q output from each of the flip-flops 38a-f is connected to the D input of a different one of a second set of six flip-flops 40a-f forming six pairs of signal sample storage flip-flops, i.e. 38a and 40a, 38b and 40b, et cetera. The previously sampled group of six signal samples is stored in flip-flops 40a-f. The clock input terminals of the flip-flops 40a-f are also connected to a different one of the secondary clock signals CLK1-CLK6 respectively.

The Q outputs from each pair of flip-flops 38a-f and 40a-f are connected to the inputs of a separate one of six exclusive OR gates 42a-f. For example, the Q outputs of flip-flops 38a and 40a are connected to the two input terminals of exclusive OR gate 42a. The output of each of the six exclusive OR gates 42a-f is connected to an input of a separate one of six dual input AND gates 44a-f. The other input of each of the AND gates 44a-f is connected to a different one of the enable signal outputs ENA-ENF from the sample resolver 36. Specifically, AND gate 44a receives the ENC signal, AND gate 44b is coupled to the END enable signal, and the ENE signal is connected to AND gate 44c. AND gate 44d receives the ENF signal, AND gate 44e has an input terminal connected to the ENA signal and the ENB signal is connected to the input of AND gate 44f. The output of each of the AND gates 44a-f is connected to an input of a six-input OR gate 46. The OR gate 46 produces the data output signal for the demodulator 10.

The data output signal from the OR gate 46 is coupled to logic circuit 50 which decodes the data output level for each half-bit interval to produce the data character represented by the full bit interval. As will be described, the decode logic 50 compares the two data outputs from the OR gate 46 for each bit interval to determine if a one, a zero or one of the non-data characters was received. This decode logic 50 is similar to that used in analog FSK receivers which also compare two signal samples.

The FSK Signal

Figure 5:
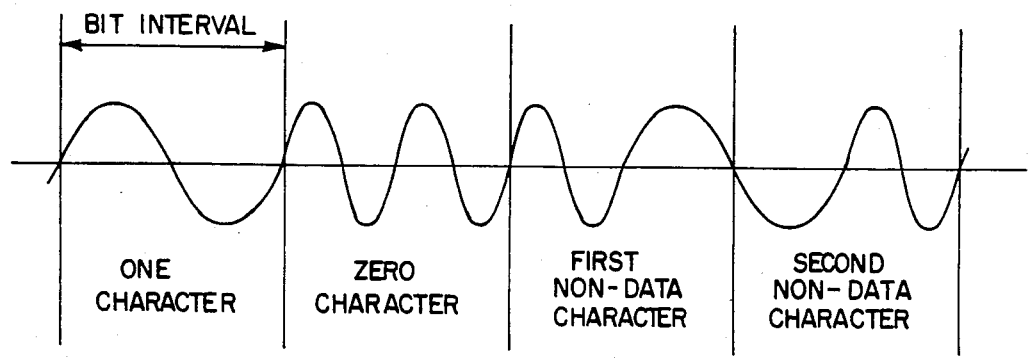
FIG. 5 is a waveform diagram of the various character signals that may be transmitted using the present phase-coherent FSK technique.

Before describing the operation of the demodulator circuit, it will be beneficial to understand how the data is being transmitted. FIG. 5 shows the FSK signals that are transmitted for each binary character. For example, the binary one bit, or mark character, is represented by a low frequency having a single cycle within the FSK bit interval and the zero bit, or space character, is transmitted as a high frequency having two cycles within each bit interval. This type of FSK signal is referred to as being phase-coherent in that both the one and zero character signals complete a whole number of cycles during each bit interval and the signal crosses the zero reference axis at the beginning and end of each bit interval. Hence it is phase-coherent, or in-phase at the start and end of each bit interval.

In addition to the zero and one character signals, two non-data characters are also sent over the communication link to the demodulator 10. The first non-data character shown in FIG. 5 consists of a first half-bit interval containing a full cycle of the high frequency for the zero character and the second half of the bit interval containing a half cycle of the low frequency representing the one character. The second non-data character has the reverse frequency pattern, in that the first half of the bit interval contains a half-cycle of the low frequency signal and the second half-bit interval contains a cycle from the high frequency signal.

Figure 4:
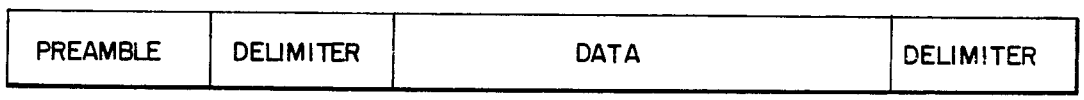
FIG. 4 is an example of a transmission data frame used with the present demodulator.

The data that is being received by the demodulator 10 is transmitted in message frames consisting of a plurality of digital bits of information. One such frame is represented in FIG. 4 and begins with a preamble consisting of a signal corresponding to the digital bit pattern "10" repeated numerous times. The preamble allows the demodulator 10 to synchronize to the received signal before actual data is received. Following the preamble is a pair of non-data characters used in a transmission frame delimiter, which precedes the data portion of the frame. The data portion is followed by another delimiter, also including a pair of non-data characters, to conclude the frame. The signal encoding is defined as never having more than two consecutive non-data characters.

Demodulator Operation

The operation of the demodulator 10 will be described with initial reference to the circuit of FIG. 1 and the waveform diagrams of FIG. 6. A sample FSK input signal is represented by the solid line in the top waveform in FIG. 6. The signal for a binary one bit is shown during the first bit interval consisting of half-bit intervals 201 and 202. The FSK signal completes one cycle during the first bit interval. A zero bit signal is illustrated by the second bit interval consisting of half-bit intervals 203 and 204. The frequency of the FSK signal during the second bit interval is twice that during the first bit interval.

The analog FSK signal is converted to a square wave by the filter 12. After being filtered, the signal is applied to the D input of the sampling flip-flop 14. The master clock signal is shown as groups of six pulses with each one of the pulses ordinally numbered to correspond to the number of the secondary clock signal CLK1–CLK6 that is produced by that pulse. Because the master clock is not synchronized to the received signal, each group of six pulses does not necessarily coincide with a half bit interval. The transition between half bit intervals may occur during any one of the master clock pulse periods in each group depending upon the timing relationship of the two signals.

In response to the rising edge of the master clock signal pulses, the first flip-flop 14 samples the output of the filter 12, producing a square wave replication of the analog input signal at its Q output terminal. Because the first half-bit interval 201 contains a positive analog signal, the Q output of the first flip-flop 14 at node A will be positive during that period. During the next half-bit interval 202, when the analog input signal is negative, a low logic level will exist at node A. The Q output of the second flip-flop 16 at node B is identical to the Q output of the sampling flip-flop 14 but is delayed by one cycle of the master clock 20.

A transition in the square wave signal is produced by the analog FSK input signal crossing the zero axis. This transition is detected by the exclusive OR (XOR) gate 18, which receives the signals from nodes A and B as its inputs. When these two signals are not equal, such as at the beginning and end of each half of the bit interval 201 and 202 for example, the output of the XOR gate 18 will be a positive for one clock cycle, as illustrated by the node C waveform in FIG. 6. When a binary one bit is received, a pulse occurs at node C only at the beginning of each half bit interval. As is seen in the second bit interval in FIG. 6 where a zero data bit has been received, the analog signal crosses the zero axis at the beginning and at the midpoint of each half bit interval 203 and 204. Therefore, the square wave replication will make four transitions within that bit interval. These transitions are indicated by four pulses at node C, which occur in synchronism with the master clock pulse that occurred when the analog signal crossed the zero axis. Although the zero crossings are shown at the rising edge of the clock pulses, they could have occurred up to a full clock period earlier in FIG. 6 without affecting the timing of the node C pulses. In this case a transition still is detected between the rising edges of clock pulses two and three.

These pulses at node C are coupled to the D input of each counter stage flip-flops 24a-f. A different one of the counter stage flip-flops 24a-f is clocked during each one of the master clock pulses in a group of six pulses. The flip-flops 24a-f indicate during which clock period a transition occurs. For example, in the timing relationship illustrated in FIG. 6, a transition in the received signal occurs just before the rising edge of the third clock pulse. Therefore, at the completion of half-bit interval 201, the third flip-flop 24c will be the only one that has a high Q output. This output indicates a transition occurred between the rising edges of the second and third clock pulses. In a half-bit interval during the transmission of a zero bit, such as interval 203, two transitions, or zero axis crossings, occur. As indicated in the exemplary waveform of FIG. 6 during interval 203, transitions occur just before the third and sixth clock pulses. At the completion of that half-bit interval 203, these transitions will be indicated by high Q outputs from flip-flops 24c and 24f, which are clocked by secondary signals CLK3 and CLK6 respectively.

The counter circuits 26a-f count the signal sample comparisons from their respective flip-flops 24a-f. For example, a high level at the Q output of flip-flop 24c produces an incrementation of the corresponding counter circuit 26c; whereas a low level Q output of a flip-flop 24c produces a decrementation of the counter circuit 26c. Each counter circuit 26a-f is clocked by a different secondary clock signal CLK1–CLK6 than its corresponding flip-flop 24a-f to allow the output of the flip-flop to be valid before the count is changed.

After several groups of six master clock pulses have occurred, the counter circuit (e.g. 26c) corresponding to the first clock pulse which occurs after the beginning of each half-bit interval will have a greater count than any of the other counters circuits 26a-f. This is because a transition will occur at the beginning of each and every half-bit interval regardless of whether a zero or a one bit has been received. A transition occurs in the middle of each half-bit interval only when a zero bit is received. Therefore, after the message frame preamble, which is a bit sequence 10 repeated numerous times, an equal number of zeroes and ones should be received and one of the counters circuits (e.g. 26c) will have a significally greater count than the others. Another counter circuit (e.g. 26f) will have a count that is approximately one-half the one counter circuit's value, with the remaining counter circuits theoretically having a zero count. In practice, however, noise may produce jitter in the transmission resulting in a slight phase shift of the received signal, so that some of the remaining counter circuits 26a-f at any given instant may have a small count therein.

Therefore, each of the counter circuits 26a-f tabulates the number of transitions that occur in the FSK signal for several groups of six clock pulses. The counter circuit 26a-f having the greatest count indicates the master clock pulse and one of the secondary clock signals CLK1-CLK6 that substantially coincide with the beginning of each half-bit interval, thus indicating a reference clock pulse for use in the decoding of the received FSK signal. The sample resolver 36 detects this one counter circuit 26a-f and produces an output on one of the six lines ENA-ENF that indicates which one of the clock signals most closely coincides with the beginning of the half-bit interval. In the example of FIG. 6, the third clock pulse and secondary clock signal CLK3 coincide with the beginning of each half-bit interval. Therefore, counter circuit 26c will have the highest count, causing the sample resolver 36 to produce a high active enable signal on output line ENC. However, since the master clock 20 and frequency divider 22 run asynchronously with the received FSK signal, any one of the six clock pulses and, therefore, any one of the six secondary clock signals CLK1-CLK6, may correspond in time with the beginning of the half-bit interval. The indication of which one of the master clock pulses most closely corresponds with the beginning of the half-bit interval is then used by the circuit in FIG. 2 to select the proper pair of data samples taken during different halves of the bit interval for decoding the FSK signal.

In the FIG. 2 circuit, each of the six pairs of flip-flops 38a-f and 40a-f stores two signal samples taken by a different one of the six clock pulses. Each of the secondary clock signals CLK1-CLK6 is applied to a different one of flip-flops 38a-f. The rising edge of each secondary clock signal clocks the signal sample then present at node A into the corresponding first flip-flop 38a-f of each pair, while at the same time clocking the sample previously stored in the first flip-flop 38a-f into the respective second flip-flop 40a-f of the pair. Each pair of flip-flops 38a-f and 40a-f store two signal samples taken by the same numbered master clock pulse during two consecutive half-bit intervals. For example, flip-flop pair 38c and 40c contain the signal samples taken by two consecutive third master clock pulses.

Each pair of stored samples is compared by the exclusive OR (XOR) gates 42a-f and the result sent to an associated AND gate 44a-f. The AND gates 44a-f function as transmission gates which are enabled by the sample resolver signals ENA-ENF. The outputs ENA-ENF from the sample resolver 36 are used to select one of these XOR gate comparisons as the output data bit of the demodulator 10 by enabling one of the AND gates 44a-f. The output ENA-ENF of the resolver 36 having a high level enable signal indicates the clock pulse which occurs at the transition between half-bit intervals. The samples taken two master clock periods before this transition provide a reliable indication of the received character.

Figure 6:
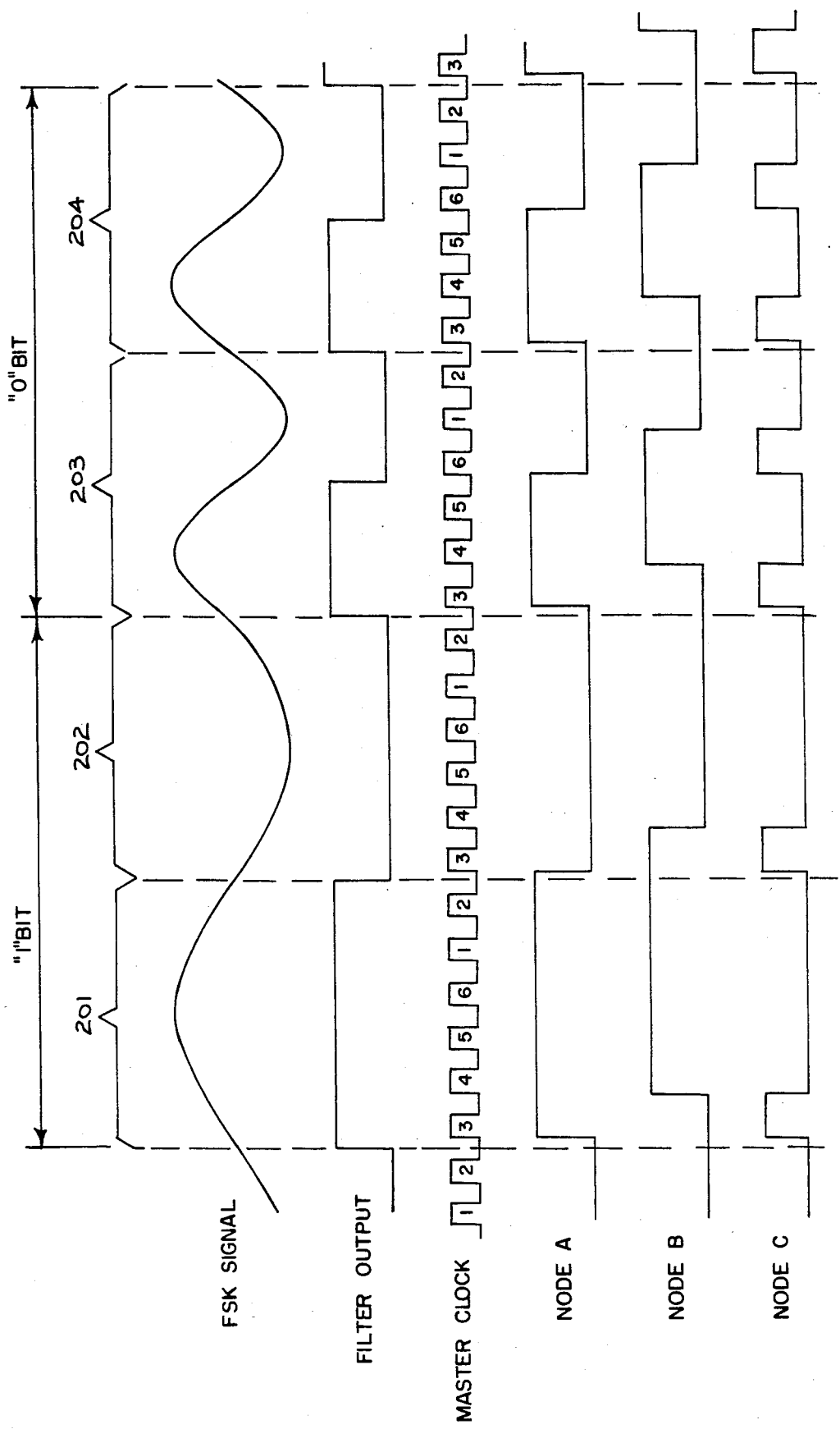
FIG. 6 is a series of waveform diagrams depicting the signals at various points in the circuits of FIGS. 1 and 2.

With reference to the exemplary waveforms of FIG. 6, the sample resolver 36 has determined that the third clock pulse occurs substantially at the half-bit interval transition. Therefore, the samples taken at the rising edge of two consecutive first clock pulses are used in decoding the received character. These samples are stored in flip-flops 38a and 40a and are compared by XOR gate 42a. The high level enable signal ENC from the sample resolver 36 causes AND gate 44a to produce an output which is the same logic level as the output from XOR gate 42a. As all of the other AND gates 42b-f receive low level enable signals, their outputs are held low. The outputs from the AND gates 44a-f are ORed by gate 46 to produce the demodulator output. This output provides an indication of whether the signal during the most recent half-bit interval had a low or a high frequency and is referred to herein as half-bit data. A low level output from OR gate 46 indicates a high frequency and a high level output designates a low frequency.

Referring still to the waveforms in FIG. 6, assume that a binary one is being received as represented in the left half of the waveform diagram. The FSK signal sample taken by the first clock pulse (during the first half-bit interval 201) will be a high level. This signal sample level appears at the Q output of flip-flop 38a. The signal sample for the previous half-bit interval stored in flip-flop 40a is a low logic level. Therefore, the output of exclusive OR gate 42a is a high level. A high level enable signal on the ENC line from the sample resolver 36 will cause AND gate 44a to replicate the logic level from the exclusive OR 42a at its output which is fed through OR gate 46 to the decode logic 50 where it is temporarily stored. The half-bit data from OR gate 46 for the first half-bit interval 201 will be a high logic level.

The FSK signal sample for the second half-bit interval 202 will be similarly processed. This signal sample is a low logic level. The exclusive OR gate 42a will receive this low level and the high level sample from the previous half-bit interval 201. Therefore, the half-bit data output from OR gate 46 also will be a high logic level for the second half-bit interval 202.

When the half-bit to full-bit decode logic 50 receives high logic level outputs for both halves of the bit interval, it knows that a low frequency signal was sent for the entire bit interval and therefore the data character sent was a one.

When a zero character is received, as shown in the right half of the waveform diagram of FIG. 6, the two signal samples compared after the first half-bit interval 203 will both be low levels. These signal samples will produce a low level half-bit data output from OR gate 46. The signal sample taken during the second half-bit interval 204 is also a low logic level. When the OR gate 42a receives this low level and the low level of the sample from the first half-bit interval 203, it will output a low logic level to the decode logic 50. In this case, the outputs from OR gate 46 for both half-bit intervals 203 and 204 are both low logic levels representing that a high frequency signal was received for the entire bit interval. The decode logic 50 recognizes that when this occurs a zero character has been received.

It should be noted that when a one or a zero data character is received, both of the half-bit data logic levels from OR gate 46 for the bit interval are the same.

However, when a non-data character (FIG. 5) is received, the two half-bit data outputs will be different logic levels. The decode logic 50 also recognizes the two consecutive non-data characters in the frame delimiters.

The decoding decribed above is based on an analysis of the two half-bit data output levels for a bit interval. Therefore, the two output levels must be from the same data bit interval and not one output level from each of two consecutive bit intervals. During the reception of the data frame preamble (see FIG. 4), when the bit pattern "10" is repeated a number of times, the decode logic 50 synchronizes to the half-bit data outputs for the bit intervals. Specifically, the alternating preamble pattern of ones and zeroes will produce an output from OR gate 46 that consists of alternating pairs of ones and zeroes. Each pair of identical logic levels represents the levels for each bit interval. The decode logic 50 uses the preamble to synchronize to the two half-bit data output levels from the demodulator for each bit interval.

We claim:

1. A demodulator for a frequency shift keyed (FSK) signal having bit intervals during each of which a bit of data is transmitted, the demodulator comprising:
    means for generating a master clock signal having X number of pulses during each half of the bit interval of the FSK signal;
    means for sampling the FSK signal during each pulse;
    means for counting the number of transitions in the FSK signal that correspond in time to each of the same ordinally numbered pulses in a plurality of groups of X ordinally numbered pulses,
    means for indicating for which ordinally numbered pulse the most transitions were counted; and
    means responsive to the indicating means for comparing a pair of samples selected from different halves of a bit interval.

2. The demodulator as recited in claim 1 wherein said means for counting comprises:
    means for generating X different secondary clock signals each having a transition that occurs during a different one of X pulse periods of the master clock; and
    a plurality of counter means each responsive to a different one of the secondary clock signals for counting any transitions in the FSK signal that correspond in time to the master clock pulse associated with that secondary clock signal.

3. The demodulator as recited in claim 2 wherein said means for generating X different secondary clock signals comprises a plurality of flip-flops connected in cascade, an output of the last flip-flop in the cascade connected to the data input of the first flip-flop in the cascade and the master clock signal generating means coupled to a clock input terminal of each flip-flop in the cascade.

4. The demodulator as recited in claim 2 wherein said means for comparing includes:
    a plurality of X pairs of flip-flops, the first flip-flop of each pair having an input terminal connected to the sampling means and an output terminal connected to the input of the second flip-flop of the pair, each of the second flip-flops of each pair having an output terminal, and each pair of flip-flops having their clock terminals connected in common to a different one of the X secondary clock signals; and
    a set of X first logic gates, each of which is associated with a different pair of flip-flops and having the output terminal of each flip-flop of the pair connected to its input terminals.

5. The demodulator as recited in claim 4 wherein said means for comparing further includes a set of X second logic gates each connected to the output of one of the first logic gates, said second logic gates transmit the output of the first logic gate to an output of the second gate upon being enabled by the means for indicating.

6. The demodulator as recited in claim 5 wherein said means for indicating includes means for enabling a different second logic gate depending upon for which one of the X originally numbered pulse the most transitions were counted.

7. The demodulator as recited in claim 1 wherein said sampling means comprises a flip-flop having a data input terminal for receiving the FSK signal and a clock input terminal connected to said means for generating the master clock signal.

8. A demodulator for a frequency shift keyed signal having intervals during each of which a bit of data is transmitted, the demodulator comprising:
    means for sampling the FSK signal Y number of times during each bit interval;
    means for detecting signal transitions between samples in a group of X ordinally numbered samples, where X is less than Y;
    means for determining for which one of the same ordinally numbered samples of several groups of samples the most transitions occur; and
    means responsive to said determining means for selecting the signal samples to be used for signal decoding.

9. The demodulator as recited in claim 8 wherein said means for sampling includes a master clock which generates a signal having X cycles per half of the bit interval.

10. The demodulator as recited in claim 9 wherein said means for sampling further includes means for generating X different secondary clock signals each having a transition which occurs during a different one of the X cycles of the master clock.

11. The demodulator as recited in claim 10 wherein said means for detecting comprises means for comparing consecutive samples of said frequency shift keyed signal.

12. The demodulator as recited in claim 11 wherein said means for determining comprises X number of counter means coupled to said means for comparing, each of said counter being responsive to a signal from said means for generating to count the transitions that occur for one of the ordinally numbered samples.

13. The demodulator as recited in claim 9 wherein said selecting means comprises:
    X number of means for storing two samples taken during the same ordinally numbered pulse of two consecutive halves of a bit interval;
    X number of means for comparing the two samples stored in a different one of the means for storing; and
    X logic gates each receiving the output signal from one of the comparing means for transmitting the output signal to an output terminal in response to a signal from said determining means.

14. A demodulator for a frequency shift keyed signal having bit intervals during each of which a bit of data is transmitted, the demodulator comprising:
    means for generating a clock signal having Y number of cycles per bit interval;

means for producing X number of different secondary clock signals, each having a frequency that is one-half the frequency of the clock signal;

a first flip-flop having an input for receiving the frequency shift keyed signal, a clock terminal coupled to said clock signal generating means, and an output terminal;

a second flip-flop having an input connected to the output terminal of the first flip-flop, a clock terminal coupled to said clock signal generating means, and an output terminal;

a first comparator means connected to the output terminals of the first and second flip-flops for producing a signal indicating the comparison of the outputs of the two flip-flops;

a first set of X flip-flops each having an input terminal connected to the comparator means for receiving the indicating signal, each flip-flop in the first set having a clock input terminal which receives a different secondary clock signal;

a set of X counter circuits, each one connected to the output of a different flip-flop in the first set and each counter circuit having an enable terminal which receives a different secondary clock signal;

means for determining which one of the X counter circuits has the greatest count;

a second set of X flip-flops, each having an input terminal connected to the output of the first flip-flop, and each having a clock terminal which receives a different secondary clock signal;

a third set of X flip-flops, each of which having an input terminal connected to the output of a different one of the flip-flops in the second set, and each having a clock terminal which receives the same secondary clock signal as the flip-flop in the second set to which the flip-flop in the third set is connected;

a set of X second comparator means each of which is connected to the output of a flip-flop in the second set and the output of a flip-flop in the third set; and means responsive to the determining means for selecting the output from one of the X second comparator means.

* * * * *

UNITED STATES PATENT AND TRADEMARK OFFICE
CERTIFICATE OF CORRECTION

PATENT NO. : 4,785,255

DATED : November 15, 1988

INVENTOR(S) : Mark A. Lucak et al.

It is certified that error appears in the above-identified patent and that said Letters Patent is hereby corrected as shown below:

In Column 10,
   at Line 12, Change "originally" to --ordinally--.

Signed and Sealed this

Eighteenth Day of July, 1989

Attest:

DONALD J. QUIGG

Attesting Officer

Commissioner of Patents and Trademarks